May 19, 1942.  M. F. KOHINKA  2,283,812
INSECT BRUSHING DEVICE
Filed Nov. 5, 1941  2 Sheets-Sheet 1
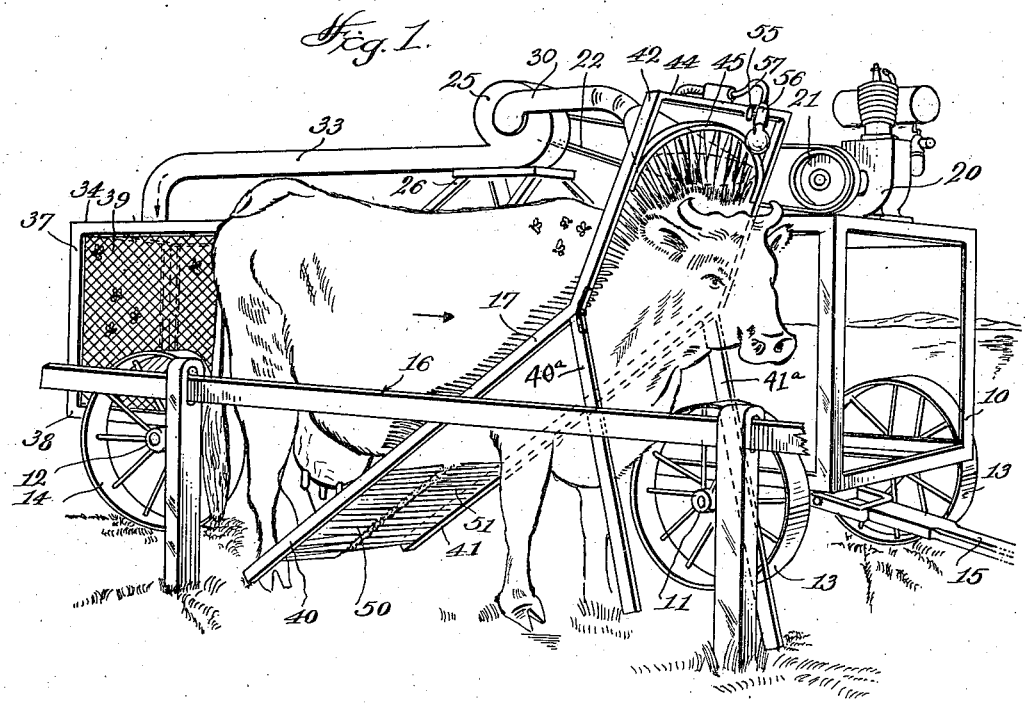
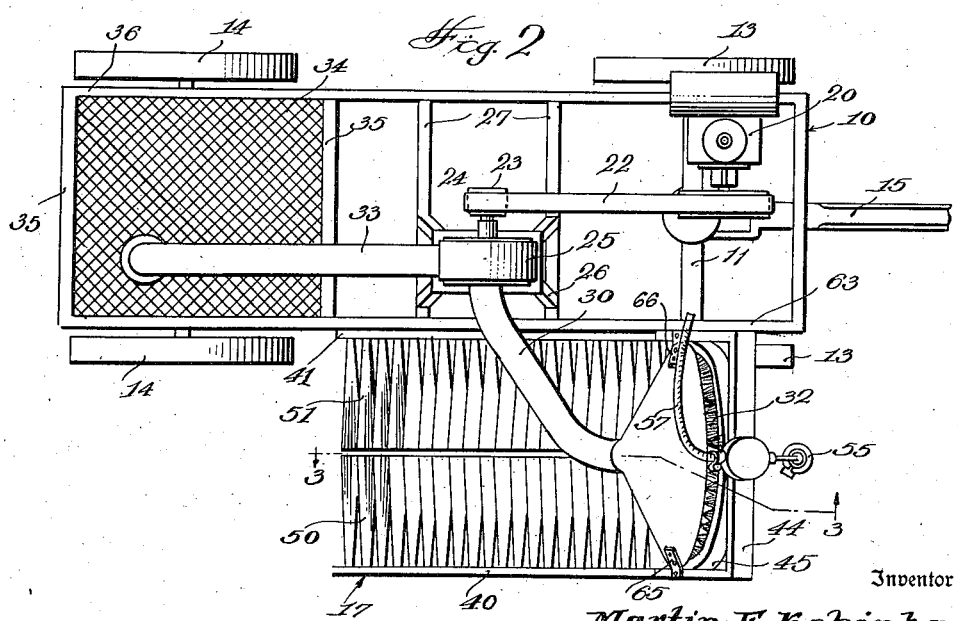
Inventor
Martin F. Kohinka
By Munn, Liddy, Glaecum & Kane
Attorneys Patented May 19, 1942

2,283,812

UNITED STATES PATENT OFFICE 2,283,812

INSECT BRUSHING DEVICE

Martin F. Kohinka, Rio Dell, Calif.

Application November 5, 1941, Serial No. 417,952

5 Claims. (Cl. 119—156)

This invention relates to an apparatus for removing insects from animals.

An object of the invention is the provision of an apparatus which is supported by a wheeled carriage having a body which will support a brushing device through which an animal may be driven for removing insects therefrom and for causing the insects to be ejected sufficiently beyond and away from the brushing device that they will be drawn in through a suction apparatus and then deposited in a cage.

Another object of the invention is the provision of an apparatus for removing and trapping flies or other insects from cows just before the cow is to be milked, in which the insects are brushed away from the body of the cow and then collected by a suction apparatus for disposition in a trap, said insect removing device including a frame having brushes extending toward each other with the free ends in close association and with the frame so devised that the head of the animal may be moved through the brushing device before the greater portion of the body has been brushed.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a view in perspective of the insect removing device shown in operation.

Figure 2 is a plan view of the same.

Figure 3:
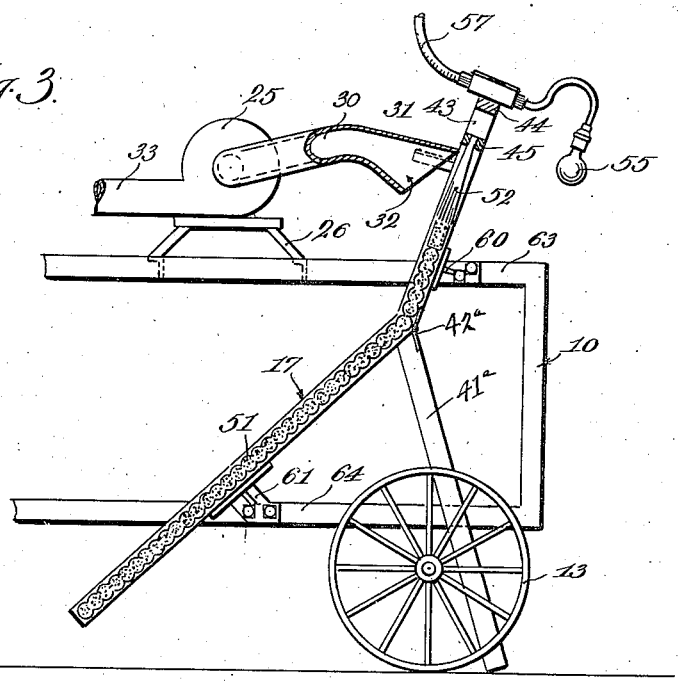
Figure 3 is a longitudinal vertical section taken along the line 3—3 of Fig. 2.
Figure 4:
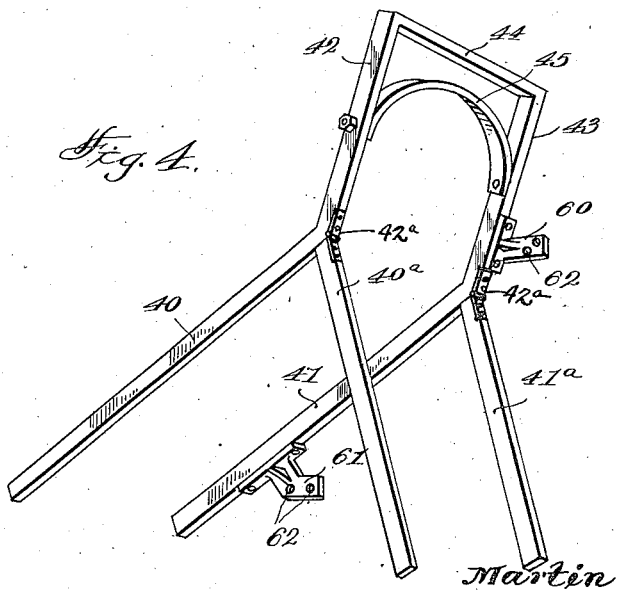
Figure 4 is a view in perspective of the brushing frame shown in detached relation.

Referring more particularly to the drawings, it will be seen that the insect removing device is supported and carried by a body 10 which is mounted on axles 11 and 12 which in turn are supported by pairs of wheels 13 and 14, respectively located at the front and rear of the body. The wheeled carriage may be drawn by horses which are hitched to a tongue 15 or the wheeled carriage may be transported by a tractor. In any event, the carriage is placed in spaced relation with a fence or guard generally designated by the numeral 16. By such disposition of the carriage the animal may be readily guided between the carriage and the fence so that it will pass through a brushing device 17.

The body consists of a framework upon which is mounted a motor 20 of any suitable type which drives the pulley 21 upon which is trained a belt 22 that in turn drives a pulley 23 connected to a shaft 24 of a suction device 25. The suction device is mounted on a table 26 carried by bars 27 forming part of the upper framework of the body 10.

An intake pipe 30 is connected with the suction side of the member 25 and is also in communication with a hood 31 which is flared outwardly and has a broad open mouth 32 located adjacent the brushes in the upper portion of the brushing device 17.

An exhaust pipe 33 is connected with the exhaust port of the suction device 25 and extends rearwardly over the body 10 and is in communication with the top of an insect cage 34.

The cage is built into the rear of the body 10 and consists of bars 35, 36, 37 and 38 upon which is secured a wire netting 39. This cage may be provided with a door for cleaning out the dead insects or flies which have been forced into the cage from the exhaust pipe 33.

The brushing device 17 consists of a U-shaped frame having legs 40 and 41 which are inclined to the horizontal. The upper portions of the legs as shown at 42 and 43 are bent at an angle to the lower portion. A bar 44 connects the upper portions of the legs together. A curved bight portion 45 is located below the bar 44 and is secured to the inner walls of the portions 42 and 43 of their respective legs 40 and 41.

A plurality of brushes generally designated by the numeral 50 are secured to the inner walls of the leg 40 and the bent portion 42 of said leg. These brushes extend inwardly with the free ends terminating along a line midway between the legs 40 and 41. A plurality of brushes 51 are secured to the inner wall of the leg 41 and likewise to the bent portion 43 of said leg and these brushes extend inwardly and terminate adjacent the free ends of the brushes 50. It will be noted that the brushes 52 which are secured to the inner face of the bight portion 45 are radially disposed and extend inwardly and downwardly so that the spaces between the legs 40 and 41, the bent portions 42 and 43 respectively of the legs and the bight portion 45 are substantially traversed with the brushes so that if an animal were forced to pass between the legs of the U-shaped brushing device 17 the entire body and head of the animal will be brushed by the members 50, 51 and 52.

A lamp 55 is carried by a socket 56 at the end of a pipe 57 which carries the electric wires, and this pipe extends inwardly, carrying the wires therewith for connection to a source of current. When this lamp is lighted it will serve the purpose of directing the animal between the legs of the brushing device.

Since the bent portions 42 and 43 of the legs 40 and 41 are rigidly connected together by means of the top bar 44 and the bight portion 45, it is only necessary to supply angularly disposed brackets 60 and 61 to the leg 41 and its respective bent portion 43. These brackets are provided with perforations as shown at 62 to receive bolts for securing the U-shaped frame directly to the side bars 63 and 64 of the body 10 of the vehicle.

In order to stabilize the hood 31 brackets 65 and 66 are respectively connected to the bent portions 42 and 43 of the legs 40 and 41 and these brackets are secured to the opposite ends of the hood 31 in order to maintain the hood in a predetermined position adjacent the inclined upper portion of the insect brushing device.

As has been stated, the vehicle is drawn to a position where it will be in parallel relation with a fence or a bar which is supported above the ground so that the brushing device 17 will be located between the body 10 and the fence 16. The cows are then driven toward the brushing device whence the brushes will drag along the head and the body of the animal causing insects or flies to be dislodged from the hair and since the suction device is in operation the removed insects or flies will be drawn through the open end of the hood 31 and will be carried rearwardly through the pipe 30 and then discharged through the pipe 33 into the cage 34 where they will remain until they are destroyed in a well known manner.

The upper portions of the legs 40 and 41 are bent towards the direction of the oncoming animal so that the head of the animal will begin to move through the brushes at the upper portion of the brushing device before any major portion of the body is involved with the brushes. In other words, after the animal has forced its head through the upper brushes it will have more of a tendency to move forwardly, otherwise if the body of the animal were engaged first with the brushes the animal may tend to move backwardly and get out of the way of the brushes. On the other hand, after the animal has freed its head it will move forwardly.

Braces 40a and 41a are pivotally connected to the respective legs 40 and 41 as shown at 42a for aiding in supporting the brushing device. The legs may be moved upwardly when the device is moved. If necessary any well-known form of latching means may be employed for retaining the braces in an inoperative or operative position.

The brushing device may be made in different sizes for taking care of various types of animals.

I claim:

1. An insect brushing apparatus comprising a U-shaped frame having a curved bight portion at the upper end thereof, a vehicle body, means securing the frame to the side of the body so that said frame will be inclined to the vertical, brushes secured to the inner walls of the legs of the frame throughout the length thereof and to the bight portion, the brushes on one leg projecting toward the brushes on the other leg with the free ends of said brushes being in close association with each other, the brushes on the bight portion being radially disposed, a suction pipe having a flared mouth located adjacent the radially disposed brushes for collecting insects removed from animals passing through the free ends of the brushes, a cage in communication with the pipe, a suction device intercalated in the pipe and means on the body for operating the suction device.

2. An insect brushing apparatus comprising a U-shaped frame having a curved bight portion at the upper end thereof, a vehicle body, means securing the frame to the side of the body so that said frame will be inclined to the vertical, brushes secured to the inner walls of the legs of the frame throughout the length thereof and to the bight portion, the brushes connected to the bight portion being radially disposed, the free ends of the brushes on the legs being in close association, the upper portion of the frame adjacent the bight portion being bent at an angle to the remaining portion, a suction pipe having a flared mouth located adjacent the radially disposed brushes for collecting insects removed from animals passing through the free ends of the brushes, a cage in communication with the pipe, a suction device intercalated in the pipe and means on the body for operating the suction device.

3. An insect brushing apparatus through which an animal is adapted to be driven, comprising a U-shaped frame, means supporting the frame at an angle to the horizontal, brushes extending from the inner faces of the legs of the frame with the free ends of the brushes of one leg being in close association with the free ends of the brushes on the other leg, the upper portion of the frame being bent backwardly at an angle to the lower portion of the frame and oppositely to the path of travel of the animal through the brushes so that the animal's head will be moved through the brushes before any great portion of the body of the animal will come into contact with the brushes.

4. An insect brushing apparatus through which an animal is adapted to be driven comprising a U-shaped frame, means supporting the frame at an angle to the horizontal, brushes extending from the inner faces of the legs of the frame with the free ends of the brushes of one leg being in close association with the free ends of the brushes on the other leg, the upper portion of the frame being bent backwardly at an angle to the lower portion of the frame and oppositely to the path of travel of the animal through the brushes so that the animal's head will be moved through the brushes before any great portion of the body of the animal will come into contact with the brushes, a hood having an open portion located adjacent the bent portion of the frame, a depository for insects, a suction device, a pipe connecting the hood with the suction device, a discharge pipe connecting the depository with the suction device and means for operating the suction device.

5. An insect brushing apparatus through which an animal is adapted to be driven comprising a U-shaped frame, means supporting the frame at an angle to the horizontal, brushes extending from the inner faces of the legs of the frame with the free ends of the brushes of one leg being in close association with the free ends of the brushes on the other leg, the upper portion of the frame being bent backwardly at an angle to the lower portion of the frame and oppositely to the path of travel of the animal through the brushes so that the animal's head will be moved through the brushes before any great portion of the body of the animal will come into contact with the brushes, a cage, and means for collecting and depositing in the cage the insects which have been brushed from the animal.

MARTIN F. KOHINKA.